United States Patent [19]

Arikawa et al.

[11] 4,420,814
[45] Dec. 13, 1983

[54] WHEEL SPEED MEASURING CIRCUIT

[75] Inventors: Tetsuro Arikawa; Teruo Inoue; Yukihiro Takiue, all of Yokosuka, Japan

[73] Assignee: Nippon Air Brake Co., Ltd., Kobe, Japan

[21] Appl. No.: 275,974

[22] Filed: Jun. 22, 1981

[30] Foreign Application Priority Data

Jun. 27, 1980 [JP] Japan .................................. 55-88193
Jun. 13, 1981 [JP] Japan .................................. 56-91210

[51] Int. Cl.$^3$ .............................................. G01P 3/56
[52] U.S. Cl. ................................... 364/565; 364/426; 377/39; 324/166; 361/242
[58] Field of Search ............................. 364/426, 565; 235/92 FQ, 92 TF, 92 TC; 324/160, 161, 163, 166; 361/236, 240, 242; 303/20, 91, 94, 95, 105

[56] References Cited

U.S. PATENT DOCUMENTS

| | | | |
|---|---|---|---|
| 3,922,534 | 11/1975 | Gerstenmeier et al. | 364/565 |
| 4,056,287 | 11/1977 | Gudat | 364/565 |
| 4,056,778 | 11/1977 | Randazzo | 235/92 FQ |
| 4,151,466 | 4/1979 | Boyer et al. | 235/92 FQ |
| 4,166,976 | 9/1979 | Ruhnau et al. | 364/565 |
| 4,229,695 | 10/1980 | Bassi | 324/166 |
| 4,323,976 | 4/1982 | Radaelli et al. | 235/92 FQ |

FOREIGN PATENT DOCUMENTS 1482158 10/1977 United Kingdom .

*Primary Examiner*—Gary Chin
*Attorney, Agent, or Firm*—McDougall, Hersh & Scott

[57] ABSTRACT

A wheel speed measuring circuit includes a counter controlled by a wheel speed signal having a frequency proportional to the rotational speed of the wheel sensed by a wheel speed sensor associated with a wheel; a comparator for comparing the digital output of the counter with a predetermined digital value; a wheel speed generating circuit for generating a digital output corresponding to the rotational speed of the wheel on the basis of the output of the comparator; and a pulse generator for generating pulses of a frequency proportional to the digital output of the wheel speed generating circuit, the pulse generator receiving the digital output of the wheel speed generating circuit, wherein the counter receives the output pulses of the pulse generator to count the output pulses thereof for the period of the wheel speed signal or for a time interval relating to the period of the wheel speed signal, and the digital output of the counter is compared with the predetermined digital value in the comparator.

15 Claims, 4 Drawing Figures

WHEEL SPEED MEASURING CIRCUIT

BACKGROUND OF THE INVENTION

1. Field of the Invention

This invention relates to a wheel speed measuring circuit, and more particularly to a wheel speed measuring circuit which is most suitable for a skid control system for a vehicle.

2. Description of the Prior Art

Recently, various kinds of vehicle skid control arrangements have been developed to effect a skid control operation by means of which a locked wheel condition can be avoided and good braking performance can be obtained on any road. In all of these skid control arrangements, a rotational condition or skid condition of the wheel, such as deceleration, slip and acceleration, is measured by a control unit which receives a signal detected by a wheel speed sensor which is associated with a wheel for detecting the rotational speed of the wheel. The brake fluid pressure to the brake for the wheel is controlled on the basis of the measurement of the control unit.

In the control unit, the deceleration, slip and acceleration of the wheel are measured or calculated from the wheel speed signal detected by the wheel speed sensor. To calculate the slip of the wheel, an approximate vehicle speed is simulated on the basis of the wheel speed signal. The calculated decelerated and acceleration are compared with predetermined reference deceleration and acceleration to generate deceleration and acceleration signals, and the calculated slip is compared with a predetermined reference slip to generate a slip signal. The brake fluid pressure to the brake for the wheel is controlled with the deceleration and acceleration signals, and slip signal. The basic value for the skid control operation is a wheel speed.

Recent skid control systems have a tendency to be digital. The sinusoidal output of the wheel speed sensor associated with the wheel is wave-shaped to obtain rectangular pulses. The frequency of the pulses is proportional to the wheel speed. Accordingly, the wheel speed is measured on the basis of the pulses. In order to measure the wheel speed, hitherto, the pulses are counted for a predetermined time, or clock pulses of high frequency are counted for time intervals between the successive pulses from the wheel speed sensor. The time interval between the successive pulses is in reverse proportion to the wheel speed. However, in the former measuring method, the predetermined time should be considerably long so as to rise the measurement accuracy of the wheel speed, and therefore, a long time is required for measuring the wheel speed. In the latter measuring method, the measurement accuracies between a high wheel speed and a low wheel speed are greatly different from each other.

Further in both of the above measuring methods, complicated circuits are required for differentiating the measured wheel speed for obtaining the deceleration and acceleration of the wheel.

SUMMARY OF THE INVENTION

Accordingly, it is an object of this invention to provide a wheel speed measuring circuit by which a wheel speed can be immediately measured.

Another object of this invention is to provide a wheel speed measuring circuit in which deceleration and acceleration of the wheel can be easily obtained without complicated circuit.

A further object of this invention is to provide a wheel speed measuring circuit which is provided with a failure detecting circuit.

In accordance with an aspect of this invention, a wheel speed measuring circuit includes (A) a counter controlled by a wheel speed signal having a frequency proportional to the rotational speed of the wheel sensed by a wheel speed sensor associated with a wheel; (B) a comparator for comparing the digital output of the counter with a predetermined digital value; (C) a wheel speed generating circuit for generating a digital output corresponding to the rotational speed of the wheel on the basis of the output of the comparator; and (D) a pulse generator for generating pulses of a frequency proportional to the digital output of the wheel speed generating circuit, the pulse generator receiving the digital output of the wheel speed generating circuit, wherein the counter receives the output pulses of the pulse generator to count the output pulses for the period of the wheel speed signal or for a time interval relating to the period of the wheel speed signal, and the digital output of the counter is compared with the predetermined digital value in the comparator.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

Figure 1:
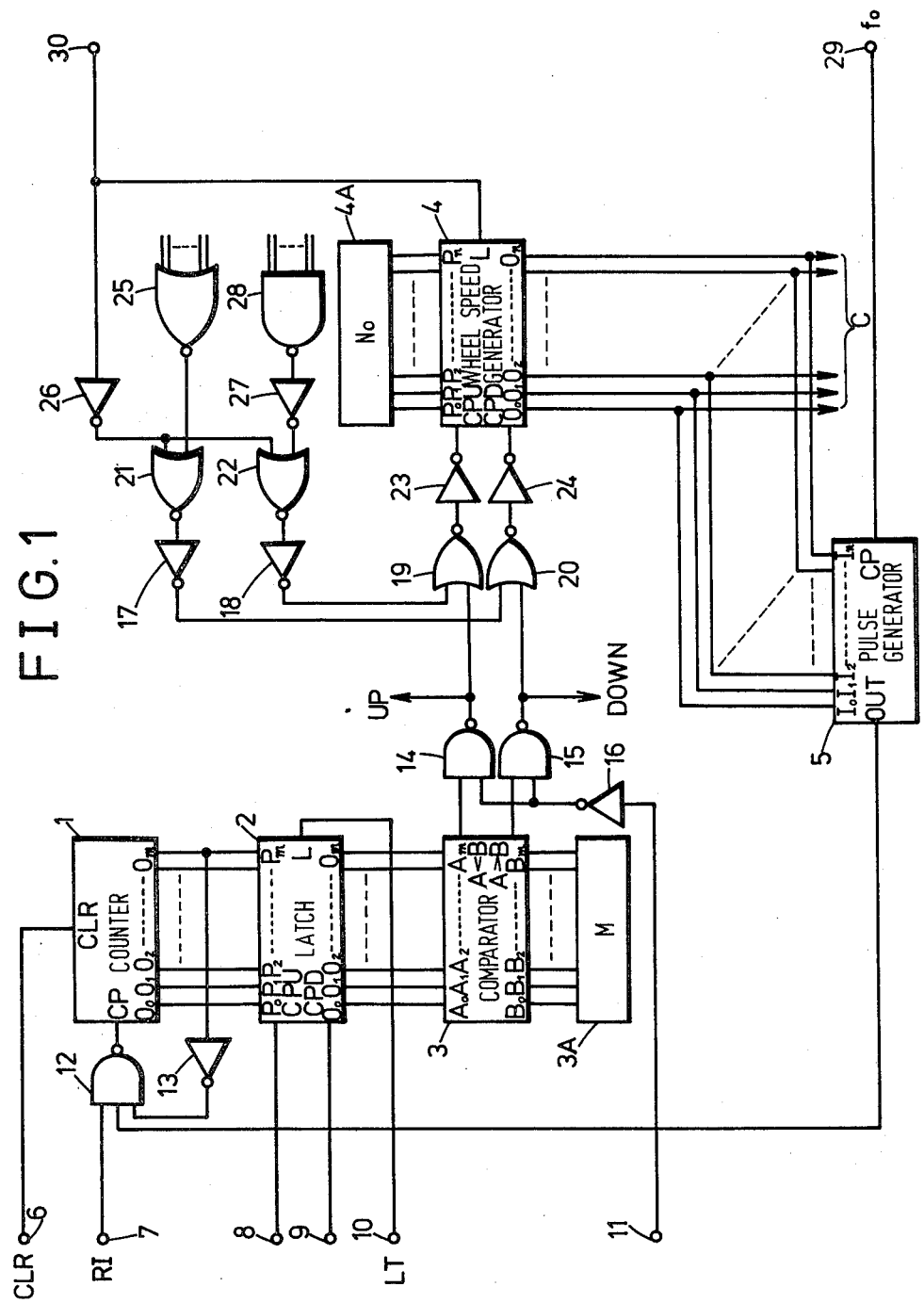
FIG. 1 is a circuit diagram of a wheel speed measuring circuit according to one embodiment of this invention.

FIG. 1 shows a wheel speed measuring circuit for a skid control system for a vehicle according to one embodiment of this invention.

The wheel speed measuring circuit of FIG. 1 includes mainly a counter 1, a latch circuit 2, a comparator 3, a wheel speed generator 4 and a pulse generator 5. The counter 1 is constituted by a binary counter. The latch circuit 2 functions as a compensator, and is constituted by a presettable UP/DOWN binary counter. The wheel speed generator 4 is constituted by a presettable binary UP/DOWN counter. The pulse generator 5 is constituted by a binary rate multiplier.

Figure 2:
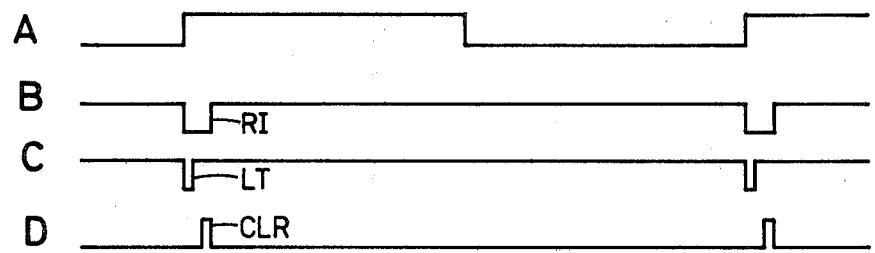
FIG. 2 is waveforms of signals at the respective parts in FIG. 1.

Although not shown, a wheel speed sensor is associated with a wheel for detecting the rotational speed of the wheel. A sinusoidal wave having a frequency proportional to the rotational speed of the wheel is obtained by the wheel speed sensor, and it is wave-shaped as a rectangular wave shown in FIG. 2A. A negative wheel speed pulse RI is formed with the leading edge of the rectangular wave representing the wheel speed, as shown in FIG. 2B. A negative latch signal LT is formed with the falling edge of the wheel speed pulse RI, as shown in FIG. 2C. A positive clear signal CLR is formed with the rising edge of the wheel speed pulse RI, as shown in FIG. 2D.

The clear signal CLR shown in FIG. 2D is supplied through an input terminal 6 to a terminal CLR of the counter 1. The wheel speed pulse RI shown in FIG. 2B is supplied through an input terminal 7 and a NAND gate 12 to a clock pulse terminal CP of the counter 1. Output terminals Oo to Om of the counter 1 are connected to preset-input terminals Po to Pm of the latch circuit 2. A compensating pulse UP or DOWN to be described hereinafter is supplied through an UP input terminal 8 or a DOWN input terminal 9 to a CPU terminal of the latch circuit 2 or a CPD terminal thereof. The output terminal Om of the terminals Oo to Om of the counter 1, as the most significant bit (MSB), is connected through an inverter 13 to one terminal of the NAND gate 12.

The latch signal LT shown in FIG. 2C is supplied through an input terminal 10 to a latch signal input terminal L of the latch circuit 2. Output terminals Oo to Om of the latch circuit 2 are connected to comparison input terminals Ao to Am of the comparator 3. A preset circuit 3A is connected to reference input terminals Bo to Bm of the comparator 3. A predetermined digital value "M" is set in the comparator 3 by the preset circuit 3A.

A first comparison output terminal A<B of the comparator 3 and a second comparison output terminal A>B thereof are connected through NAND gates 14 and 15, NOR gates 19 and 20 and inverters 23 and 24 to input terminals CPU and CPD of the wheel speed generator 4, respectively. A preset circuit 4A is connected to preset-input terminals Po to Pn of the wheel speed generator 4. A predetermined digital value "No" corresponding to the minimum wheel speed Vmin is set in the wheel speed generator 4 in the preset circuit 4A. For example, 5 km/h is set as the minimum wheel speed Vmin. When a power switch for the whole circuit of FIG. 1 is turned on, a negative pulse is applied to an input terminal 30, and it is supplied to a terminal L of the wheel speed generator 4 to preset the digital value "No" therein.

Output terminals Oo to On of the wheel speed generator 4 are connected to input terminals Io to In of the pulse generator 5, respectively. All of the output terminals Oo to On except the terminals which become high level "1" at the digital value "No", of the wheel speed generator 4, are connected to input terminals of a NOR gate 25 for detecting the minimum wheel speed, respectively. For example, if "No" is equal to "15", all of the output terminals O4 to On except the output terminals O0, O1, O2 and O3 which signify "$2^0$", "$2^1$", "$2^2$" and "$2^3$" at the high level "1", respectively, are connected to the input terminals of the NOR gate 25. The sum of "$2^0$", "$2^1$", "$2^2$" and "$2^3$" is equal to "15". All of the output terminals $O_0$ to $O_m$ of the wheel speed generator 4 are connected to input terminals of a NAND gate 28 for detecting the maximum wheel speed. The NOR gate 25 is connected through a NOR gate 21 and an inverter 17 to another input terminal of the NOR gate 20. The NAND gate 28 is connected the through an inverter 27, a NOR gate 22 and another inverter 18 to another input terminal of the NOR gate 19.

Clock pulses having a frequency fo are supplied through an input terminal 29 to a clock input terminal CP of the pulse genrerator 5. An output terminal OUT of the pulse generator 5 is connected to one input terminal of the NAND gate 12. The frequency fo of the clock pulses is set to frimax XM, where frimax represents the maximum frequency of the wheel speed pulse RI, and M represents the pedetermined digital value set in the comparator 3.

The input terminal 30 is further connected through an inverter 26 to other input terminals of the NOR gates 21 and 22. The output terminals O0 to On are connected, although not shown, to an approximate vehicle speed signal forming circuit, a slip signal generating circuit, etc. in a skid control system, as indicated by C. Timing pulses of high frequency such as 2 kHz are supplied to an input terminal 11, and they are supplied through an inverter 16 to other input terminals of the NAND gates 14 and 15. The pulses obtained from the NAND gates 14 and 15 in response to the output of the comparator 3 are supplied to the UP terminal 8 and DWN terminal 9.

Next, there will be described operations of the above described wheel speed measuring circuit.

For facilitating the understanding, there will be considered the case that the vehicle is accelerated from the stop condition, and its wheel speed approaches the set maximum wheel speed.

The power switch (not shown) for the whole circuit of FIG. 1 is turned on at the start of the vehicle. The negative pulse is supplied to the input terminal. The wheel speed generator 4 is preset to the digital value "No". When the wheel speed becomes the maximum speed Vmax, all of the outputs of the output terminals $O_o$ to $O_n$ of the wheel speed generator 4 become "1". Thus, the digital value of $(2^0+2^1+2^2+ \ldots +2^n=2^{n+1}-1)$ corresponds to the maximum wheel speed Vmax.

The pulse generator 5 constituted by the rate multiplier generates pulses of the following frequency f from the output terminal OUT:

$$f = fo \times \frac{\text{Digital Output of Wheel Speed Generator 4}}{2^{n+1}},$$

where fo represents the frequency of the clock pulses supplied to the input terminal CP of the pulse generator 5. Thus, pulses having a frequency proportional to the digital output of the wheel speed generator 4 are obtained from the pulse generator 5.

When the power switch for the whole circuit of FIG. 1 is turned on, pulses having a frequency $$f = fo \times \frac{N_0}{2^{n+1}}$$

are generated from the pulse generator 5 and they are supplied to the one input terminal of the NAND gate 12. The output of the inverter 13 and the wheel speed pulse RI shown in FIG. 2B are supplied to the other two input terminals of the NAND gate 12. The input terminal of the inverter 13 is connected to the MSB terminal $O_m$ of the counter 1. Normally, the output of the MSB output terminal $O_m$ is "0". Accordingly, the pulses from the pulse generator 5 start to be counted at the same time when the wheel speed pulse RI becomes "1" from "0". The latch signal LT shown in FIG. 2C and the clear signal CLR shown in FIG. 2D are formed with the wheel speed pulse RI. The latch signal LT is supplied to the terminal L of the latch circuit 2, and the clear signal CLR is supplied to the terminal CLR of the counter 1. The output of the counter 1 is latched in the latch circuit 2 by the latch signal LT, and then the content of the counter 1 is cleared up by the clear signal CLR.

The wheel speed V is lower immediately after the start of the vehicle than the set minimum wheel speed Vmin. The output of the wheel speed generator 4 is "No" at that time. Accordingly, the pulses of $$fo \times \frac{N_0}{2^{n+1}} \times \frac{1}{fri}$$

are counted in the time interval between the successive wheel speed pulses RI, namely in the period of 1/fri, by the counter 1. The output of the counter 1 is latched in the latch circuit 2 by the latch signal LT which occurs with the next wheel speed pulse RI. The digital output of the latch circuit 2, which is the latched output of the counter 1, is supplied to the input terminals $A_0$ the $A_m$ of the comparator 3. It is compared there with the predetermined digital value "M" set in the reference input terminals $B_0$ to $B_m$. The present wheel speed V, immediately after the start of the vehicle, is lower than the set minimum wheel speed Vmin. Accordingly, the digital value applied to the input terminals $A_0$ to $A_m$ is larger than the pedetermined digital value "M" since the digital value "M", as hereinafter described, is equal to the number of the pulses of the pulse generator 5 counted in the one period of the wheel speed pulse RI at the time when the wheel speed V is equal to the set minimum wheel speed Vmin, and a high level signal "1" is generated from the second comparison output terminal A>B of the comparator 3. The A>B output from the comparator 3 is supplied to the one input terinal of the NAND gate, and the timing pulses of 2 kHz are supplied through the inverter 16 to the other input terminal of the NAND gate 15. The timing pulses of 2 kHz are supplied through the NAND gate 15 to the one input terminal of the NOR gate 20. At that time, the output of the wheel speed generator 4 is "No". Accordingly, the output of the NOR gate 25 for detecting the minimum wheel speed is "1", and so the output "0" of the inverter 17 is supplied to the other input terminal of the NOR gate 20. Thus, the NOR gate 20 is put in the non-conductive state for the timing pulses. They are not transmitted to the CPD terminal of the wheel speed generator 4. The output of the wheel speed generator 4 remains "No". As above described, the wheel speed generator 4 is preset to the digital value "No" on the turning-on of the power switch. So long as the wheel speed V is lower than the minimum wheel speed Vmin, the output of the wheel speed generator 4 is kept at the digital value "No".

As above described, when the power switch is turned on, the negative pulse is supplied thorugh the input terminal 30 to the inverter 26. Thus, influence of noises occurring on the turning-on of the power switch is avoided.

The predetermined digital value "M" set in the comparator 3 is so designed as to be equal to the number of the pulses of the pulse generator 5 counted in the one period of the wheel speed pulse RI at the time when the wheel speed V is equal to the set minimum wheel speed Vmin. Accordingly, when the frequency of the wheel speed pulse RI corresponding to the set minimum wheel speed Vmin is represented by fri min, the digital value M is expressed by the following equation:

$$M = \frac{N_0}{2^{n+1}} \times fo \times \frac{1}{fri\, min},$$

where "No" represents the digital output of the wheel speed generator 4, corresponding to the set minimum wheel speed Vmin, and fo represents the frequency of the clock pulses supplied to the input terminal 29.

The wheel speed V reaches the set minimum wheel speed Vmin, and goes beyond the latter. However, as long as the number of the pulses counted in the period of the wheel speed pulse RI is equal to "M", the output of the wheel speed generation 4 remains unchanged. Where ΔV represents a speed difference corresponding to a digital value "1" or one bit, as described hereinafter, the number of the pulses counted in the time interval between the first wheel speed pulse RI after the wheel speed V becomes higher than Vmin+ΔV, and the next wheel speed pulse RI is equal to "M−1", since the period of the wheel speed pulse RI is shortened by a time width corresponding to ΔV, and the present frequency of the pulses of the pulse generator 5 is equal to the previous frequency of the pulses of the pulse generator 5 relating to the previous period of the wheel speed pulse RI. Accordingly the output of the first comparison input terminal A<B of the comparator 3 becomes "1". One of the timing pulses of 2 kHz is supplied through the NAND gate 14, NOR gate 19 and inverter 23 to the CPU terminal of the wheel speed generator 4. It is further supplied from the NAND gate 14 to the CPU terminal of the latch circuit 2. The content of the latch circuit 2 counts up by one, and the output of the latch circuit 2 becomes again "M". Accordingly the output of the first comparison output terminal A<B of the comparator 3 becomes again "0". Thus, only one timing pulse is transmitted through the NAND gate 14.

The speed difference ΔV for which the number of the pulses counted in the period of the successive wheel speed pulses RI is smaller by "1" than the digital value "M" is expressed in the following relationship with the other values:

Where the frequency of the wheel speed pulse RI at the wheel speed of (Vmin+ΔV) is represented by fri, and the counted number in the corresponding period of the successive wheel speed pulses RI is represented by M', the following equation is obtained:

$$\frac{N_0}{2^{n+1}} \times fo \times \frac{1}{fri\, min} - \frac{N_0}{2^{n+1}} \times fo \times \frac{1}{fri'} =$$

$$\frac{N_0}{2^{n+1}} \times fo \left( \frac{1}{fri\, min} - \frac{1}{fri'} \right) = 1,$$

since M−M′=1.
Therefore, $$f'ri - fri\, min = \frac{2^{n+1}}{N \times fo} \times fri\, min \times fri' = \frac{1}{M} \times fri'.$$

Where f'ri−frimin=Δfri, Δfi=1/M×fri'.

Since the frequency fri of the wheel speed pulse RI is proportional to the wheel speed V, the following equation is obtained from the above equation:

$$\Delta V = \frac{1}{M}(V\text{min} + \Delta V) \therefore \Delta V = \frac{V_{min}}{M-1} \ (M > 1).$$

Thus, the value of $\Delta V$ can be arbitrarily determined by a suitable M. Although there have been described the case that the wheel speed increases by $\Delta V$ from the minimum wheel speed Vmin, it is clear that the above relationship holds true also for the case that the wheel speed increases by $\Delta V$ from an arbitrary wheel speed Vi.

Thus, the output of the wheel speed generator 4 becomes "$N_0+1$" from "$N_0$". Pulses having a frequency of $$fo \times \frac{N_0 + 1}{2^{n+1}}$$

are generated from the pulse generator 5, and are supplied to the counter 1. The frequency of the present output pulse of the pulse generator 5 is $(N_0+1)/N_0$ times as high as that of the previous output pulse of the pulse generator 5.

Figure 3:
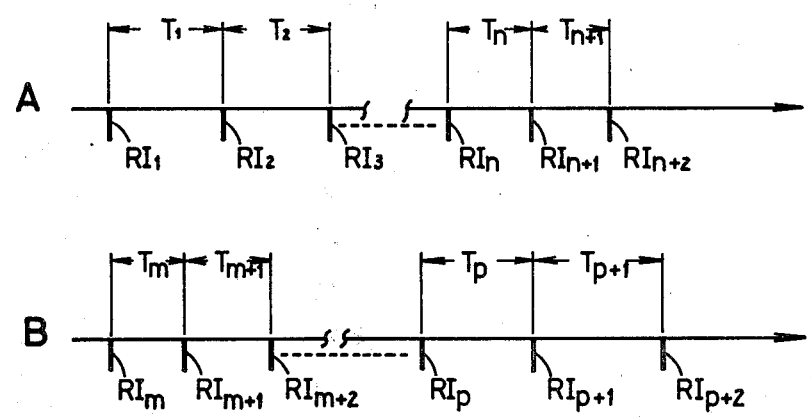
FIG. 3 is time charts of wheel speed pulses for explaining operation of the wheel speed measuring circuit of FIG. 1.

The periods $T_1, T_2, \ldots T_n, T_{n+1}$ between the successive wheel speed pulses $RI_1$ and $RI_2$, $RI_2$ and $RI_3 \ldots RI_n$ and $RI_{n+1}$, $RI_{n+1}$ and $RI_{n+2}$ are successively shortened as shown in FIG. 3A ($T_1 > T_2 > \ldots > T_n > T_{n+1} > \ldots$), where $T_1$ represents the period of the successive wheel speed pulses $RI_1$ and $RI_2$ at minimum wheel speed Vmin. When the wheel speed pulse $RI_n$ is the first after the wheel speed V becomes higher than the wheel speed $Vm = V\text{min} + \Delta V$, the period Tn is shorter by a time corresponding to one pulse of the pulses having the frequency of $N_0/2^{n+1} \times fo$ than the period $T_1$. In other words, the counted number of the counter 1 in the period $T_n$ is "M−1". Accordingly, the output of the wheel speed generator 4 increases by "1", and the frequency of the output pulses of the pulse generator 5 becomes higher as $$\text{"} \frac{N_0 + 1}{2^{n+1}} \times fo\text{"}.$$

Such pulses are counted in the next period $T_{n+1}$ by the counter 1. Accordingly, the output of the counter 1 becomes again "M".

Whenever the wheel speed pulse RI is supplied to the CP terminal of the counter 1, the counter 1 is cleared, the content of the counter 1 is latched in the latch circuit 2, and the output of the latch circuit 2 is compared with the reference input M of the comparator 3. However, until the wheel speed V becomes higher than a wheel speed $Vr = V_m + \Delta V$, the output of the comparison output terminal A<B of the comparator 3 remains "0", and the output of the wheel speed generator 4 remains unchanged as "$N_0+1$". However, the period between the first wheel speed pulse RI after the wheel speed V goes beyond the wheel speed Vr, and the next wheel speed pulse RI becomes shorter by a time corresponding to $\Delta V$ than the period Tn between the first wheel speed pulse $RI_n$ after the wheel speed V became higher than the wheel speed Vm, and the following wheel speed pulse $RI_{n+1}$. The frequency of the output pulses of the pulse generator 5 is still equal to the previous frequency for the periods in which the wheel speed V does not yet reach the wheel speed Vr. Accordingly, the output of the counter, becomes "M−1" in the period between the first wheel speed pulse RI after the wheel speed V becomes higher than the wheel speed Vr, and the next wheel speed pulse RI. The output of the comparison output terminal A<B of the comparator 3 becomes "1". The output of the wheel speed generator 4 increases by "1".

As above described, the digital output of the wheel speed generator 4 increases with the wheel speed. When the wheel speed reaches the set maximum speed Vmax, all of the output signals of the output terminals $O_0$ to $O_n$ of the wheel speed generator 4 becomes "1". Since all of the output terminals $O_0$ to $O_n$ of the wheel speed generator 4 are connected to the input terminals of the NAND gate 28, its output becomes "0". Accordingly, the output of the inverter 18 becomes "1", and the NOR gate 19 becomes nonconductive for the timing pulses. Even when the timing pulses are supplied from the NAND gate 14, the wheel speed generator 4 does not count up. Thus, all of the output signals of the output terminals $O_0$ to $O_n$ are prevented from becoming "0" by supplying one timing pulse to the CPU terminal of the wheel speed generator 4.

Actually, the wheel speed scarcely reaches the set maximum wheel speed Vmax. However, the wheel speed can always securely and reliably measured in the above-described manner. If the wheel speed becomes higher than the set maximum wheel speed Vmax, the constant wheel speed Vmax corresponding to $(2^{n+1}-1)$ is obtained from the wheel speed generator 4.

The digital output of the wheel speed generator 4 changes in the above described manner, when the wheel is accelerated from the stop condition to the set maximum wheel speed Vmax.

Next, there will be described the relationship between the digital output of the wheel speed generator 4 and the wheel speed.

The counted number M' by the counter 1 in one period of the successive wheel speed pulses RI is generally expressed by the following equation:

$$M' = \frac{N}{2^{n+1}} \times fo \times \frac{1}{fri} = \frac{fo}{2^{n+1}} \times \frac{N}{fri},$$

where N represents the digital output of the wheel speed generator 4, and fri the frequency of the wheel speed pulse RI, at an arbitrary wheel speed V.

Since the number M' is always so compensated as to be equal to the predetermined digital value M, the following equation is obtained:

$$M = \frac{fo}{2^{n+1}} \times \frac{N}{fri}$$

$$\therefore N = \frac{2^{n+1}}{fo} \times M \times fri$$

Since the wheel speed V is proportional to the frequency fri of the wheel speed pulse RI, the following relationship is obtained:

$$fri = kV,$$

where K represents a proportional constant. Therefore, $$N = M \times \frac{2^{n+1}}{f_o} \cdot \kappa \cdot V \, (N > N_o)$$

In the above equation, M, fo and $2^{n+1}$ are constant. Accordingly, it is clear that the digital output N of the wheel speed generator 4 changes in proportion to the wheel speed V. The speed value corresponding to one bit or digital value "1" can be determined with the above-described constants.

Next, there will be described the case that the running vehicle or the rotating wheel is braked.

It is assumed that the wheel is in uniform rotation of speed Vm'. The counted number of the pulses of the pulse generator 5 in the period of the successive wheel speed pulses RI is equal to "M" before the wheel is braked. The digital output of the wheel speed generator 4 is constant. When the vehicle is braked, the wheel speed decreases. The periods of the successive wheel speed pulses are lenghtened with time, as $Tm < Tm+1 < \ldots < Tp < T_{p+1} \ldots$, as shown in FIG. 3B. The wheel is in uniform rotation of Vm' during the period of the wheel speed pulses RIm to $RI_{m+1}$. It is braked during the period of the wheel speed pulses $RI_{m+1}$ to $RI_{m+2}$. Accordingly, the period $T_{m+1}$ is longer than the period Tm. However, the difference between them is not so much that the counted number in the counter 1 increases. The wheel speed becomes lower than $V_p = V_m' - \Delta V$, in the period Tp of the wheel speed pulses $RI_p$ to $RI_{p+1}$. The difference between the periods $T_p$ and $T_m$ is so much that the counted number in the counter 1 increases by one. The output of the counter 1 becomes "M+1" from "M". The output signal of the second comparison output terminal A>B of the comparator 3 becomes "1". The wheel speed generator 4 counts down by one. The frequency of the pulses of the pulse generator 5 proportionally decreases. Accordingly, the counted number of the pulses in the counter 1 becomes again "M" in the following period $T_{P+1}$. Further, when some wheel speed pulses RI have passed in accordance with the braking force to the wheel, the wheel speed becomes lower than $V_p - \Delta V$, and the counted number of the pulses in the counter, becomes again "M+1". The content of the wheel speed generator 4 counts down by one. In the above described manner, the digital output of the wheel speed generator 4 decreases. When a desired wheel speed or vehicle speed is obtained, the brake is released. The digital value corresponding to the desired wheel speed is obtained from the wheel speed generator 4. When the wheel stops, the digital output of the wheel speed generator 4 remains "No". However, when the power switch is turned off, the wheel speed generator 4 and the other circuits are returned to the initial conditions.

As above described, the wheel speed measuring circuit of this embodiment measures immediately the present wheel speed. Speed variations of the wheel are obtained as a count-up pulse signal and a count-down pulse signal for the wheel speed generator 4 from the NAND gates 14 and 15. Accordingly, a wheel acceleration or a wheel deceleration necessary for the skid control operation can be very easily calculated. Whenever the wheel speed changes by $\Delta V$, one pulse is obtained as a count-up signal or a count-down signal from the NAND gate 14 or 15. A wheel acceleration or a wheel deceleration can be immediately obtained by counting such pulses for a predetermined time.

Further in the above embodiment, the pulses from the NAND gates 14 and 15 are generated in synchronization with the timing pulses of 2 kHz. Accordingly, when a shock is suddenly imparted to the wheel to rapidly change the wheel speed within 1/[2000 (2 kHz)] seconds, or for example, when the wheel speed is temporarily changed by bumpiness of road, the wheel speed measuring circuit of this embodiment does not respond to such noise-like changes. Accordingly, stable skid control operation can guaranteed.

The digital output of the wheel speed generator 4 is supplied to a approximate vehicle speed generating circuit, a slip signal generating circuit, etc. in a skid control system. Control signals for valves controlling brake pressures to the wheel are formed on the basis of the outputs of the approximate vehicle speed generating circuit and slip signal generating circuit, the calculated wheel acceleration or deceleration, etc. in the skid control system. Various skid control systems and their operations are well known. Accordingly the description of the skid control system will be omitted here.

Further in the above embodiment, the digital output of the wheel speed generator 4 is prevented from becoming lower, then "No" by arranging the NOR gate 25. The reason is that, when the wheel speed is very low, or near zero, the output of the wheel speed sensor associated with the wheel is very unstable or almost zero, and so a stable output can be obtained from the wheel speed generator 4.

Next, a wheel speed measuring circuit according to another embodiment of this invention will be described with reference to FIG. 4.

This embodiment is provided with a failure detecting circuit. Parts in FIG. 4 which correspond to those in FIG. 1, are denoted by the same reference numerals. In comparison with the circuit of FIG. 1, the circuit of FIG. 4 further includes mainly a flip flop 32, a second counter 33 which is constituted by a binary counter, and a second comparator 34. In the first comparator 3' of this embodiment, new most significant bits (MSB) as a new comparison inpput terminal $A_{m+1}$ and a new reference input terminal $B_{m+1}$ are added to the comparator 3 of FIG. 1. The new reference input terminal $B_{m+1}$ is grounded.

The wheel speed pulse RI is supplied through an AND gate 31 and the NAND gate 12 to the CP terminal of the first-mentioned counter 1. As in the first embodiment, the preset circuit 4A is connected to the preset input terminals $P_0$ to $P_n$ of the wheel speed generator 4. However, a digital value "NO'" set by the preset circuit 4A is larger than the digital value "No" corresponding to the minimum wheel speed $V_{min}$ set in FIG. 1. When the power switch for the whole circuit of FIG. 1 is turned on, the negative pulse is applied to the input terminal 30, and it is supplied to the terminal L of the wheel speed generator 4 to preset the digital value "No'" therein. As in the first embodiment, all of the output terminals $O_0$ to $O_n$ except the terminals which become high level "1" at the digital value "$N_0$" corresponding to the minimum wheel speed Vmin, of the wheel speed generator 4, are connected to the input terminals of the NOR gate 25 for detecting the minimum wheel speed.

The input terminal 30 is further connected through an inverter 35 to a set terminal S of a flip flop 32. The output terminal of the NOR gate 25 is further connected to a reset terminal R of the flip flop 32, and to one input terminal of an AND gate 37 for detecting failure of the wheel speed measuring circuit. An Q output terminal of the flip flop 32 is connected through an inverter 36 to another input terminal of the AND gate 31, and directly to the MSB input terminal $A_{m+1}$ of the first comparator 3'. The Q output terminal of the flip flop 32 is further connected to one input terminal of an AND gate 38. As in the first embodiment, a not-shown timing pulse generator is connected to the input terminal 11. The frequency of the timing pulse is, for example, 2 kHz. The input terminal 11 is connected to the inverter 16 and another input terminal of the AND gate 38. An output terminal of the AND gate 38 is connected to a CP terminal of the second counter 33. Output terminals $O_0$ to $O_l$ of the second counter 33 are connected to comparison input terminals $A_0$ to $A_l$ of the comparator 34. A preset circuit 34A is connected to reference input terminals $B_0$ to $B_l$ of the second comparator 34. A predetermined digital value "L" is set in the second comparator 34 by the preset circuit 34A. An output terminal A=B of the second comparator 34 is connected to a negation input terminal of the AND gate 37. The output terminal of the AND gate 37 is connected to a failure display circuit or failure warning means, although not shown. The predetermined digital value L set in the second comparator 34 is equal to the digital value of $(N_o' - N_0)$.

Next, there will be described operation of the wheel speed measuring circuit of FIG. 4.

Figure 4:
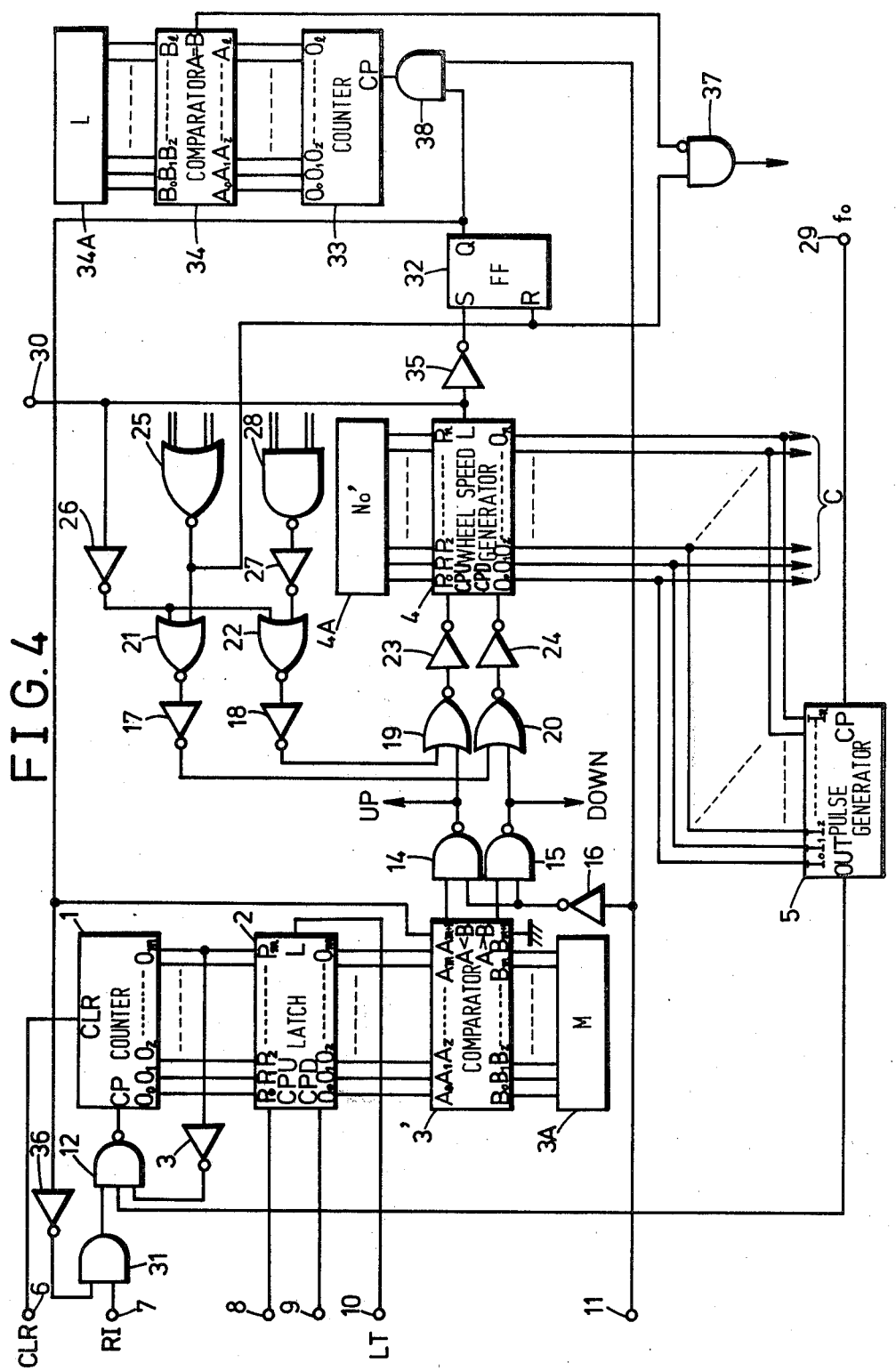
FIG. 4 is a circuit diagram of a wheel speed measuring circuit according to another embodiment of this invention.

Before the start of the vehicle, the power switch is turned on for the whole circuit of FIG. 4. The negative pulse is supplied to the input terminal 30 on the turning-on of the power switch. The predetermined digital value No' is preset in the wheel speed generator 4. An output signal "1" from the inverter 35 is supplied to the set terminal S of the flip flop 32. An output signal of the Q-output terminal of the flip flop 32 becomes "1", and it is supplied to the MSB comparison input terminal $A_{m+1}$ of the first comparator 3'. The output of the comparison output terminal A>B of the first comparator 3' becomes "1", since the MSB reference input terminal $B_{m+1}$ is grounded. On the other hand, the Q output "1" of the flip flop 32 is supplied to the inverter 36 and the AND gate 38. The wheel speed pulse RI is inhibited from passing through the AND gate 31. The timing pulses from the input terminal 11 are supplied through the inverter 16, NAND gate 15, NOR gate 20 and inverter 24 to the CPD terminal of the wheel speed generator 4. The wheel speed generator 4 starts to count down from the preset digital value "No'". The timing pulses from the input terminal 11 are further supplied through the AND gate 38 to the CP terminal of the second counter 33. The second counter 33 starts to count the timing pulses.

When the digital output of the wheel speed generator 4 is reduced to the digital value No corresponding to the minimum wheel speed Vmin, all of the input signals to the input terminals of the NOR gate 25 for detecting the minimum wheel speed become "0". Accordingly, the output of the NOR gate 25 becomes "1". As the result, the input signal to the one input terminal of the NOR gate 20 becomes "1". Accordingly, the timing pulses are cut off from the CPD terminal of the wheel speed generator 4. It counts down no more. A gate circuit circuit for cutting off the timing pulse from the CPD terminal of the wheel speed generator 4, as in the first embodiment, is constituted by the NOR gates 25, 21, inverter 17, and NOR gate 20.

The output "1" of the NOR gate 25 is supplied to the reset terminal R of the flip. flop 32 and the one input terminal of the AND gate 37. The output of the Q-output terminal of the flip flop 32 becomes "0". The AND gate 38 becomes non-conductive for the timing pulse. The count result of the second counter 33 is compared with the predetermined digital value L in the second comparator 34. When the wheel speed generator 4 and the associated circuits are in order, the output of the comparison output terminal of the second comparator 34 becomes "1", since the preset digital value L is equal to the digital value of $(N_o' - N_0)$. Accordingly, the output of the fail detecting AND gate 37 remains "0". Thus, the AND gate 37 does not generate the failure signal.

When the wheel generator 4 or the associated circuit is out of order or fails, the number of the timing pulses counted by the second counter 33 in the time extending from the time of the turn-on of the power switch to the time when the digital output of the wheel speed generator 4 has reached the No corresponding to the minimum wheel speed V min, is smaller or larger than the predetermined digital value L, and the output of the comparison output terminal A=B of the second comparator 34 remains "0". Accordingly, when the output "1" of the NOR gate 25 is supplied to the one input terminal of the AND gate 37, the output of the AND gate 37 becomes "1". Thus, the AND gate 37 generates the failure signal which is used for informing the driver of the failure of the wheel speed measuring circuit, and stopping the control operation of the skid control system.

The signal "0" of the Q-output terminal of the flip flop 32 is further supplied to the inverter 36 and the MSB terminal $A_{m+1}$ of the first comparator 3'. Now, the AND gate 31 becomes conductive for the wheel speed pulse RI. The first counter 1 can count the pulses of the pulse generator 5. In the comparator 3', the digital value applied to the comparison input terminals $A_0$ to $A_m$ is compared with the predetermined digital value "M" applied to the reference input terminals $B_0$ to $B_m$. The pulses having a frequency of $$f_0 \times \frac{N_0}{2^{n+1}}$$

are occurring from the pulse generator 5. Hereafter the same operation as described in the first embodiment can be performed in the wheel speed measuring circuit of FIG. 4.

In the second embodiment, as above described, as soon as the power switch for the wheel circuit is turned on, the AND gate 31 becomes non-conductive for the wheel speed pulse RI, and the wheel speed generator 4 starts to count down from the preset digital value "No'" to the predetermined digital value No corresponding to the minimum wheel speed Vmin. The timing pulses start to be counted by the second counter. Thus, it is checked whether the wheel speed measuring circuit is in order, or not. The fail check ends at the time when the output of the Q output terminal of the flip flop 32 becomes "0" from "1". If the wheel speed measuring circuit is out of order, the fail singal is obtained from the AND gate 37, and the failure can be immediately detected. Whenever the power switch is turned on, the fail check is automatically effected. Accordingly, the failure can be securely detected. Further, the timing pulses for measuring the wheel speed are used for the fail check. Accordingly, the failure detecting circuit is very simple in construction.

The second embodiment is so designed as to generate the failure signal in the case that the count result of the counter 33 is different from the predetermined digital value "L" which is equal to the digital value of (No'—No). However, the reference digital value set in the second comparator 34, as the case may be, may be larger or smaller than the above digital value "L". In that case, when the count result of the counter 33 is larger or smaller than the reference digital value, the failure signal is generated. Or the reference digital value to be compared with the count result of the second counter 33 may be within some range, for example, in consideration of transient noise occurring on the turn-on of the power switch. In that case, for example, a frequency divider may be connected between the AND gate 38 and the second comparator 33. A reference digital value "SL" is used instead of the reference digital value "L" for the comparator 33. The ratio S may be equal to the dividing ratio S' of the frequency divider. Instead of the frequency divider, two preset circuits, two comparators connected respectively to the two preset circuits and an AND gate may be used. One digital value $L_1$ is set in the one comparator by the one preset circuit, while another digital value $L_2 (L_1 > L_2)$ is set in the other comparator by the other preset circuit. The count result of the counter 33 is supplied to the two comparators. When the count result of the counter 33 is smaller than the digital value $L_1$, output of a comparison output terminal B>A of the one comparator becomes "1". When the count result of the counter 33 is larger than the digital value $L_2$, output of a comparison output terminal of the other comparator becomes "1". The outputs of the comparators are supplied to the AND gate. Output "1" of the AND gate is supplied to the negation input terminal of the AND gate 37. Thus, when the count result W of the counter 33 is within the range of $L_1 > W > L_2$, it is judged that the wheel measuring circuit is in order.

While the preferred embodiments have been described, variations thereto will occur to those skilled in the art within the scope of the present inventive concepts which are delineated by the following claims.

For the example, in the above embodiments, the pulses of the pulse generator 5 are counted every period of the wheel speed pulses RI. However, they may be counted every plural periods of the wheel speed pulses RI.

Further in the above embodiments, the NAND gate 28 for detecting the maximum wheel speed is used for preventing the wheel speed generator 4 from overflowing. However, when a binary counter having a sufficiently large capacity is used as the wheel speed generator 4, the NAND gate 28 and the associated circuit can be omitted.

What is claimed is:

1. A wheel speed measuring circuit comprising:
   (A) a counter controlled by a wheel speed signal having a frequency proportional to the rotational speed of the wheel, sensed by a wheel speed sensor associated with a wheel;
   (B) a comparator for comparing the digital output of said counter with a predetermined digital value M, said comparator generates a first output signal when the output of said counter is less than the value M and a second output signal when the output of said counter is greater than the value M;
   (C) a wheel speed generating circuit operatively connected to said comparator for generating a digital output corresponding to the rotational speed of the wheel, wherein said digital output of the wheel speed generating circuit is increased from a pre-existing digital output of said wheel speed generating circuit in response to said first comparator output signal and decreased from said pre-existing digital output in response to said second comparator output signal; and
   (D) a pulse generator for generating pulses of a frequency proportional to said digital output of the wheel speed generating circuit, said pulse generator receiving said digital output of the wheel speed generating circuit, wherein said counter receives the output pulses of said pulse generator to count said output pulses for each period of the wheel speed signal or for a time interval relating to each period of the wheel speed signal, and the digital output of said counter is compared when said predetermined digital value in said comparator.

2. A wheel speed measuring circuit according to claim 1, in which said wheel speed generating circuit includes an UP/DOWN counter, and said UP/DOWN counter receives timing pulses of a predetermined frequency from a timing pulse generator as a count-up signal or a count-down signal in accordance with said first and second output signals generated by said comparator.

3. A wheel speed measuring circuit according to claim 2, in which a compensation circuit is connected between said counter and said comparator, said compensation circuit receives said count-up signal or said count-down signal to equalize the digital output supplied to the comparison input terminals of said comparator with said predetermined digital value M thereof.

4. A wheel speed measuring circuit according to claim 3, in which, when the comparison output of said comparator represents that the comparison input value at said input terminals is smaller than said perdetermined digital value M, said UP/DOWN counter receives said timing pulses as said count-up signal, and when the comparison output of said comparator represents that the comparison input value is larger than said perdetermined digital value M, said UP/DOWN counter receives said timing pulses as said count-down signal.

5. A wheel speed measuring circuit according to claim 4, in which said UP/DOWN counter is preset to a predetermined digital value No corresponding to the minimum wheel speed to be measured, and a gate circuit is connected between said UP/DOWN counter and said timing pulse generator, said timing pulses as the countdown signal being cut off from said UP/DOWN counter by said gate circuit while the wheel speed is lower than said minimum wheel speed.

6. A wheel speed measuring circuit according to claim 5, in which said gate circuit includes a NOR gate, and all of the output terminals of said UP/DOWN counter except the output terminals thereof which become high at said digital value NO are connected to input terminals of said NOR gate.

7. A wheel speed measuring circuit according to claim 4, in which said compensation circuit comprises an UP/DOWN counter which latches the digital output of said counter every said period of the wheel speed signal or every said time interval relating to the period of the wheel speed signal as sensed by said wheel speed sensor.

8. A wheel speed measuring circuit according to claim 2, in which said pulse generator comprises a binary rate multiplier receiving clock pulses of a predetermined frequency.

9. A wheel speed measuring circuit according to claim 1, in which said wheel speed signal is formed from rectangular wave obtained by wave-shaping of output of a wheel speed sensor associated with the wheel.

10. A wheel speed measuring circuit according to claim 2, in which said wheel speed measuring circuit further includes an gate circuit, and a failure detecting circuit comprising a second counter and a second comparator; said UP/DOWN counter is preset to a first predetermined digital value No' larger than a second predetermined digital value No corresponding to the minimum wheel speed to be measured, at the time $t_1$ when power is supplied to said wheel speed measuring circuit; said timing pulses as the countdown signal are supplied to said UP/DOWN counter, then cut off from said UP/DOWN counter at the time $t_2$ when said UP/DOWN counter counts down to No, by said gate circuit; said second counter counts said timing pulses for a time interval between the time $t_1$ when the power is supplied to said wheel speed measuring circuit, and the time $t_2$ when said UP/DOWN counter counts down to No; the count result of said second counter is compared with a predetermined digital value, or a predetermined range in said second comparator; and when said count result of the second counter is not equal to said predetermined digital value or beyond said predetermined range, said failure detecting circuit generates a failure signal.

11. A wheel speed measuring circuit according to claim 10, in which said gate circuit includes a NOR gate, and all of the output terminals of said UP/DOWN counter except the output terminals thereof at which output signals become high at said digital value No, are connected to input terminals of said NOR gate.

12. A wheel speed measuring circuit according to claim 11, in which said time interval between the times $t_1$ and $t_2$ are detected by a flip flop.

13. A wheel speed measuring circuit according to claim 12, in which said flip flop is set at the time $t_1$ when power is supplied to said wheel speed measuring circuit, and reset with the output of said NOR gate.

14. A wheel speed measuring circuit according to claim 13, in which an output terminal of said flip flop is connected to one input terminal of an AND gate, said timing pulse generator is connected to another input terminal of said AND gate, and the output of said AND gate is supplied to said second counter.

15. A wheel speed measuring circuit according to claim 14, in which the output terminal of said flip flop is connected to the most significant bit (MSB) terminal of the comparison input terminals of said first-mentioned comparator.

* * * * *